(12) United States Patent
Gillick et al.

(10) Patent No.: US 7,133,827 B1
(45) Date of Patent: Nov. 7, 2006

(54) TRAINING SPEECH RECOGNITION WORD MODELS FROM WORD SAMPLES SYNTHESIZED BY MONTE CARLO TECHNIQUES

(75) Inventors: Laurence S. Gillick, Newton, MA (US); Donald R. McAllaster, Shrewsbury, MA (US); Daniel L. Roth, Boston, MA (US)

(73) Assignee: Voice Signal Technologies, Inc., Woburn, MA (US)

( * ) Notice: Subject to any disclaimer, the term of this patent is extended or adjusted under 35 U.S.C. 154(b) by 842 days.

(21) Appl. No.: 10/361,154

(22) Filed: Feb. 6, 2003

Related U.S. Application Data

(60) Provisional application No. 60/354,540, filed on Feb. 6, 2002, provisional application No. 60/355,089, filed on Feb. 7, 2002.

(51) Int. Cl.
*G10L 15/06* (2006.01)
(52) U.S. Cl. ...................... 704/243; 704/254
(58) Field of Classification Search ............. None
See application file for complete search history.

(56) References Cited

U.S. PATENT DOCUMENTS

| | | | | |
|---|---|---|---|---|
| 3,770,892 A | | 11/1973 | Clapper ..................... | 179/1 SB |
| 4,481,593 A | | 11/1984 | Bahler ..................... | 364/513.5 |
| 4,713,777 A | | 12/1987 | Klovstad et al. ......... | 364/513.5 |
| 4,783,804 A | | 11/1988 | Juang et al. .............. | 381/43 |
| 5,805,832 A | * | 9/1998 | Brown et al. ............. | 711/1 |
| 6,029,124 A | * | 2/2000 | Gillick et al. ............ | 704/200 |
| 6,839,669 B1 | * | 1/2005 | Gould et al. ............. | 704/246 |

OTHER PUBLICATIONS

Djuric et al.; Estimation of Nonstationary Hidden Markov Models by MCMC Sampling; Acoustics, Speech and Signal Processing, 1999, ICASSP '99, Proceedings., 1 Internationa Conference on, vol. 3, pp. 1737-1740, Mar. 1999.*

"Explorations with Fabricated Data", by Don McAllaster, Larry Gillick, Francesco Scattone, Mike Newman, from *Broadcast News Transcription Understanding Workshop*, Lansdowne Conference Resort, Lansdowne, Virginia, Feb. 8-11, 1998, 4 pages.

"Why is conversational speech so hard to recognize?" by Don McAllaster, Francesco Scattone, Mike Newman, Larry Gillick, as submitted for publication to *Speech Communication*, Nov. 4, 1999, 29 pages.

"Fabricating conversational Speech Data With Acoustic Models; A Program To Examine Model-Data Mismatch", by Don McAllaster, Larry Gillick, Francesco Scattone, Mike Newman, from the Proceedings of 5th International Conference on Spoken Language Procesing, Nov. 30-Dec. 4, 1998, Sydney, Australia, pp. 1847-1850.

(Continued)

*Primary Examiner*—Abul K. Azad
(74) *Attorney, Agent, or Firm*—Edward W. Porter

(57) ABSTRACT

A new word model is trained from synthetic word samples derived by Monte Carlo techniques from one or more prior word models. The prior word model can be a phonetic word model and the new word model can be a non-phonetic, whole-word, word model. The prior word model can be trained from data that has undergone a first channel normalization and the synthesized word samples from which the new word model is trained can undergo a different channel normalization similar to that to be used in a given speech recognition context. The prior word model can have a first model structure and the new word model can have a second, different, model structure. These differences in model structure can include, for example, differences of model topology; differences of model complexity; and differences in the type of basis function used in a description of such probability distributions.

33 Claims, 10 Drawing Sheets

OTHER PUBLICATIONS

"Studies in Acoustic Training and Language Modeling Using Simulated Speech Data", by Don McAllaster and Larry Gillick, from Proceedings of Eurospeech '99, 6th European Conference on Speech Communication and Technology, Sep. 5-9, 1999, Budapest, Hungary, pp. 1787-1790.

"Comparative Studies of Conversational vs. Read Speech Using Simulated Acoustic Data", by Francesco Scattone, Don McAllaster, and Larry Gillick, from th proceedings of Automatic Speech Recognition and Understanding Workshop, Keystone, Colorado, Dec. 12-15, 1999 (ASRU-99), pp. 103-106.

* cited by examiner

-CREATION OF PHONETIC MODELS~200
  -receive acoustic samples of training utterances~202
  -perform slow channel normalization upon frames of samples~204
  -store large vocabulary dictionary of phonetic spellings~206
  -train phonetic models of words in training vocabulary~208
  -cluster acoustic nodes of phonetic models contained in words of training utterances into node groups~210
  -represent each node of each phoneme model with the model of the node's node groups~212
  -create phonetic word models from phonetic spellings and phonetic models~214

FIG. 2
PRIOR ART

-DATA SYNTHESIS AND TRAINING~300
    -for each word for which a new word model is to be created~302
        -create phonetic word model by concatenating phoneme models associated with word's phonetic spelling~304
        -for each synthetic sample of word to be generated~306
            -for each node in phonetic model~308
                -use Monte Carlo techniques to generate a duration for the node based on node's duration probability distribution~310
                -for each of the number of frames associated with the generated node duration~312
                    -for each parameter of the model node~314
                        -use Monte Carlo techniques to generate a value for that parameter based on the parameter's probability distribution for the current node~316
                  -save the values generated for all the node's parameter as a synthesized frame~318
            -save the sequence of synthesized frames generated for each of the nodes of the phonetic model as a synthesized word model~320
        -modify synthetic word models for the word by performing fast channel normalization on them~322
        -train non-phonetic word model for the word from the modified synthetic word models which have been created for that word~324

FIG. 3

-PRODUCING NON-PHONETIC MODEL FROM PHONETIC MODEL~400

-Generate synthesized samples of word to be trained from phonetic word model using Monte Carlo techniques~402

-train whole-word model from synthetic word models~404

FIG. 4

--PRODUCING NON-PHONETIC MODEL OF WORD NOT IN TRAINING UTTERANCES~500

-train phonetic word models from words in training utterances~502

-derive phoneme models from acoustic nodes phonetic models based on clustered components~504

-create phonetic model of a new word which was not in the training utterances~506

-user Monte Carlo techniques to develop synthesized word samples of new word~508

-train non-phonetic word model from synthesized word samples of new word~510

FIG. 5

- PRODUCING AND USING MODEL WITH DIFFERENT CHANNEL NORMALIZATION THAN MODEL IT IS DERIVED FROM~600
  - train first word model for a word from plurality of samples of acoustic data which has undergone a first channel normalization~602
  - Generate synthesized samples of word from a first word model using Monte Carlo techniques~604
  - perform a second channel normalization on said plurality of synthesized word samples to produce a corresponding plurality of modified synthesized word samples~606
  - train a new acoustic word model for the word from the modified synthesized word samples~608
  - Receive utterance to be recognized~610
  - Perform second channel normalization upon it~612
  - recognize word using new acoustic word model~614

FIG. 6

- PRODUCING MODEL WITH DIFFERENT MODEL STRUCTURE THAN MODEL IT IS DERIVED FROM~700
  - Generate synthesized samples of word from a first word model having a first model structure using Monte Carlo techniques~702
  - train a new acoustic word model for the word having a different model structure from said plurality of synthesized word samples~704

FIG. 7

TRAINING SPEECH RECOGNITION WORD MODELS FROM WORD SAMPLES SYNTHESIZED BY MONTE CARLO TECHNIQUES

RELATED APPLICATIONS

This application claims priority from the following two U.S. provisional patent applications:

U.S. Provisional Patent Application No. 60/354,540 filed Feb. 6, 2002, and

U.S. Provisional Patent Application No. 60/355,089 filed Feb. 7, 2002, both of which were filed by Laurence S. Gillick et al. and both of which were entitled "Apparatus, Methods, and Programming For Training Speech Recognition Word Models From Word Samples Synthesized By Monte Carlo Techniques".

FIELD OF THE INVENTION

The present invention relates to apparatus, methods, and programming for training new speech recognition word models from prior acoustic models.

BACKGROUND OF THE INVENTION

For large vocabulary ASR (automatic speech recognition), acoustic models are commonly trained on very large databases consisting of hundreds of hours of speech. These recorded databases are available for a price much less than the cost of repeating the collection effort to obtain new training data. Models trained from these data can yield impressive performance (error rates of less than 5%) on recognition tests of dictation with essentially open vocabularies.

Commonly the acoustic models trained from such a large database are "phonetic models", since they break speech up into phoneme-like units. In a speech recognition system with phonetic word models, each word has one or more associated phonetic pronunciations, also called phonetic spellings, which indicate the sequence of one or more phonemes that define the word's pronunciation. The word's acoustic model is generated as needed from the concatenation of the acoustic models associated with the sequence of phonemes indicated by its phonetic spelling.

A common technique in the field is to represent the sound of each phoneme as a triphone: a phonetic model consisting of one or more acoustic nodes, and representing the sound of a given phoneme when it occurs in the context of the phoneme that precedes it, and the one that follows it. The way that a given phoneme will be realized depends on the phonemes that surround it: the term for this effect on a given speech sound caused by the sounds that precede or follow it is "coarticulation". Because a triphone models a "phoneme-in-context", that is, because it models the occurrence of a given first phoneme when it is preceded by a given second phoneme and followed by a given third phoneme, it does a reasonably good job of modeling the changes in the realization of a phoneme that result from coarticulation. By using several nodes, or stationary acoustic states, in the triphone model, one can represent the transitions in sound that occur between successive phonemes. These transitions (which are not instantaneous) occur as a result of the fact that the human vocal apparatus as an instrument is somewhat like a trombone, in the sense that its components—such as the tongue, teeth, and lips—that work together to create different sounds have to move in a continuous manner between the different positions associated with the formation of different phonemes.

Empirically, it has been determined that good speech recognition performance can be produced by using as the individual acoustic node models in the triphone models, acoustic node models that are derived from a cluster of similar node models which occur in different triphones. Such cluster node models are derived by clustering the individual acoustic nodes of different triphones into node groups; deriving a statistical model of each such node group; and using the statistical model of each group as the model for each of the individual triphone nodes in that group.

Standard techniques exist for automatically clustering such nodes based on linguistic knowledge and/or statistical information. U.S. Pat. No. 5,715,367, entitled "Apparatuses And Methods For Developing And Using Models For Speech Recognition" issued to Gillick et al., on Feb. 3, 1998, provides a good description of triphone models and methods for automatically clustering their associated acoustic nodes. This U.S. patent is hereby incorporated herein by reference in its entirety.

The representation of acoustic nodes by statistical models of the node group to which they belong results in better estimates of acoustic model parameters for nodes, because it tends to cause each node to have more training data associated with it. Phonetic models work well even for words never seen in the training data, because they allow a given phoneme or phoneme node model that has received training data in the utterances of one or more words to be used in the models of other words that contain the phoneme or phoneme node, respectively. Furthermore, in systems in which triphone nodes are clustered using knowledge indicating which triphone nodes are likely to have similar sounds, workable models can be created for a triphone that has never been uttered in the training data based on other similar triphones or phoneme nodes for which training data has been received.

Virtually all large vocabulary systems use phonetic models, because their benefits are particularly important in large vocabulary systems. First, they can decrease the amount of data required to represent a large number of word models, since the acoustic models of words can be represented by phonetic spellings. Secondly, they can decrease the computation required for recognition of a large number of words, since they allow the scoring of speech sounds against a sequence of one or more phonemes to be used in the scoring of multiple words that share such a phonetic sequence. Thirdly, and perhaps most importantly, they can greatly reduce the amount of training data necessary to train up a large vocabulary or to adapt large vocabulary to a particular speaker, as has been indicated above.

However, phonetic models are not optimal for all speech recognition systems, particularly smaller vocabulary speech recognition systems. Small vocabulary systems typically use "whole-word" models (i.e., non-phonetically spelled word models). In systems using whole-word models, a separate acoustic model is produced for each word. In the past, for this to work well for each of many different speakers, the training database must include recordings by many different people of each such word. Obtaining sufficient training data for a new vocabulary word generally requires a new, expensive, and time-consuming data collection. This is because even a large general-purpose speech database may not have any, or enough, samples of certain desired individual words. This is particularly true if the desired words are uncommon or made-up words, or in the case of a discrete utterance recognizer, correspond to a run-together sequence of words, such as is commonly used in many discrete utterance small-vocabulary command-and-control speech recognition applications.

One prior art approach, which can work well in some circumstances, is to use as a whole-word (or non-phonetic) acoustic model of a desired word the sequence of phonetic acoustic node models derived from a large-vocabulary database that corresponds to the phonetic spelling of the desired word.

One of the issues with using such a method to generate whole-word models is that it requires that the channel-normalization procedure used in speech recognition with such whole-word models be the same as that used in the training of the phonetic models. This is because differences in channel normalization can have such a profound effect on acoustic samples that word models trained upon acoustic data that has been normalized in one way will often be close to useless in the recognition of words in acoustic data that has been normalized a different way.

Most phonetic models are trained using stationary or quite slowly adapting channel normalization. This use of a relatively stable channel normalization is commonly used for phonetically based systems. More stable channel normalization tends to provide better channel normalization when used with acoustic data recorded in a background relatively free of changing background noises or changing recording characteristics. This is because slower channel normalization provides more time to accurately model background noise and to model the acoustic properties of a given recording set-up. It is also because slower channel normalization is less likely to mistake characteristics of the speech signal itself as channel characteristics that are to be normalized out.

But many applications cannot use a slowly-varying channel-normalization scheme, including many small vocabulary command-and-control applications, either because the channel itself is likely to be changing rapidly, such as due to rapidly changing background noise or rapid changes in the user's position relative to the microphone, or because a typical interaction with the application is likely to be too short for slow channel normalization to form a good estimate of the channel. Also, rapid channel normalization can be useful in situations in which it is desirable, either for purposes or speed of response or computational efficiencies, to be able to start recognizing the initial portions of an utterance before later parts of the utterance have been received.

Another problem with the prior art method of generating whole-word acoustic word models by concatenating acoustic models associated with phonetic spellings is that it limits the resulting whole-word acoustic models to ones having the same model structure as the phonetic models from which they are derived. For example, if the phonetic models are very high quality models using a large number of basis functions, such as Gaussians, to represent the probability distribution associated with each parameter value of a node, the resulting word model created by this method will have the same number of basis functions associated with each such parameter. This can be a disadvantage when it is desirable to have word models that require less computation to use or less memory space to store.

SUMMARY OF THE INVENTION

It is an object of the present invention to provide methods, apparatuses, and programming for deriving new speech recognition word models from prior acoustic models and/or word models.

It is another object of the present invention to provide methods, apparatuses and programming for deriving non-phonetic word models from phoneme or phonetic word models.

It is yet another object of the present invention to provide methods, apparatuses, and programming for deriving word models designed for recognizing acoustic data that has undergone a second type of channel normalization from phoneme or word models that have been trained from acoustic data that has undergone a different, first type, of channel normalization.

It is still another object of the present invention to provide methods, apparatuses, and programming for deriving word models having a second model structure from phoneme or word models that have a different, first model structure.

It is yet another object of the present invention to provide methods, apparatuses, and programming for deriving word models that require less computational resources to use and/or store from phoneme or word models that require more computational resources to use and/or or store;

According to one aspect of the present invention a method is provided for developing non-phonetic acoustic word models for use in speech recognition. The method comprises generating a plurality of synthesized word samples for a given word. Each of the synthesized word samples includes a sequence of synthesized data samples in which one or more such data samples correspond to each of a plurality of nodes in a sequence of acoustic phonetic models corresponding to the phonetic spelling of the given word. Each such synthesized data sample is generated from its corresponding phonetic model node by Monte Carlo techniques using a probability distribution associated with the node. The method further comprises training a non-phonetic whole-word acoustic word model comprised of a sequence of nodes for the given word from the plurality of synthesized word samples.

In many embodiments of this aspect of the invention each phonetic model will be comprised of multiple acoustic model nodes. For example, it is common to represent a phoneme's sound by a phoneme-in-context triphone of the general type described above in the Background Of The Invention. Generally a triphone model is a sequence of acoustic model nodes (often, but not always, three) that are used to capture differences in the sound of a given phoneme that result as a function of the phonemes that proceeds and follow the given phoneme. In other embodiments the phoneme models used might have a different number of nodes, including only one node.

In some embodiments of this aspect of the invention the acoustic model formed by the sequence of nodes of the non-phonetic word model has a different structure than the acoustic model formed by the sequence of nodes defined by the sequence of prior phonetic models which comprise the phonetic spelling of the given word. In this specification and the claims that follow, by different model structure we mean differences other than differences in parameter values and other than differences in format that do not effect a model's mathematical properties as an acoustic model of sound.

In some embodiments this different model structure is manifested by having the non-phonetic model have a different node topology, such as a different number of nodes or a different set of allowable transitions between nodes, than the sequence of phonetic model nodes defined by the phonetic spelling of the given word. In some embodiments this different model structure is a difference in model complexity between the acoustic model nodes of the non-phonetic and phonetic word models. In some embodiments this difference is a different number of basis functions in the probability distributions in the nodes of the non-phonetic word model than in the probability distributions in the phonetic word model from which the synthesized word samples are derived. For example, the phonetic word model from which synthesized word samples are generated might be a relatively high-quality model having ten or twelve Gaussian basis functions, whereas the non-phonetic word models might be designed for use on a computing device having substantially less power and/or storage, and thus might only have two to four Gaussian basis functions.

Such differences in model complexity could also result from having a different number of separate variance values associated with the probability distributions of the different models, with for example, one common variance value being used for all parameters of one model node, or for all parameters of all model nodes, or for all corresponding parameters of all model nodes in one word model, whereas the other word model might have a separately computed variance for each separate parameter of each separate model node.

In some embodiments of this aspect of the invention involving differences of model structure, the different model structure results from the fact that the probability distributions in the nodes of the non-phonetic word model are represented by one or more probability distribution basis functions of a different parametric family than the one or more probability distribution basis functions used in the phonetic word model from which the synthesized word samples are derived. For example, one of the word models might use Gaussian basis functions whereas the other might use Laplacian basis functions.

In some embodiments of this aspect of the invention that involves training non-phonetic models from phonetic models, the phonetic word model is synthesized from a sequence of one or more phoneme models that have been trained from a plurality of training utterances; and the phonetic word model is determined by the phonetic spelling of a word that is not spoken in any of the training utterances, enabling the non-phonetic word model to be derived for a word that is not spoken in the training utterances. In fact, in embodiments that are capable of deriving data for context-sensitive phoneme model nodes from nodes of other phonetic models that are linguistically or acoustically similar, it is possible by using this technique to train up non-phonetic word models containing a succession of one or more phonemes that do not occur in the human spoken training data, but which nevertheless model, to a certain degree, the co-articulation between successive phonemes in the word represented by the new word model.

According to another aspect of the present invention a somewhat similar method is provided for developing acoustic word models from synthesized word samples, but this method is not limited to the development of non-phonetic word models from phonetic word models. This method includes generating a plurality of synthesized word samples for a given word. Each such synthesized word sample includes a sequence of synthesized data samples in which one or more such data samples correspond to each of a plurality of acoustic node models in a first word model of a given word, where each synthesized data sample is generated from its corresponding first model node by Monte Carlo techniques using a probability distribution associated with the first model node. In this method the first word model is derived from one or more sequences of acoustic training samples that have undergone a first channel normalization. The method performs a second channel normalization upon the plurality of synthesized word samples to produce a corresponding plurality of modified synthesized word samples; and it trains a new acoustic word model comprised of a sequence of nodes for the given word from the plurality of modified synthesized word samples.

Some embodiments of this aspect of the invention further include performing speech recognition using one or more such new word models. This includes receiving a sequence of acoustic samples of speech sounds to be recognized; performing the second channel normalization upon the sequence of acoustic samples to be recognized; and performing speech recognition by comparing the sequence of acoustic samples to be recognized against a plurality of word models including the new acoustic word model that has been trained from synthesized words samples that have also undergone the second channel normalization.

In some embodiments of this aspect of the invention involving differences of channel normalization, the first channel normalization is a relatively slow channel normalization and the second channel normalization is a more rapid channel normalization. Such rapid channel normalization is particular useful in discrete utterance recognition, including many applications including toys or command and control. This is because such applications often involve the recognition of relatively brief utterances in which rapid channel normalization is more appropriate, and often involve the recognition of words in the presence of quickly varying noise or when a user is changing his or her location relative to the microphone. In embodiments where the original word models are phonetic word models that have been derived from continuous large vocabulary training data, slower normalization would normally have been used on such training data. This is because the utterances in such training data tend to be longer, since they are often of multiword phrases. It is also because, in many cases, such utterances are recorded under relatively ideal conditions, with relatively little background noise and with relatively stable microphone position relative to the speaker's mouths, meaning that slow channel normalization would tend to be most effective. Also slow channel normalization tends to be more desirable when training phonetic word models, because it is more likely to perform similar normalization upon the frames associated with a given phoneme or phoneme-in-context in the training data, independently of where in a word or large phrase that phoneme or phoneme-in-context occurred. This is different than fast normalization, which, because it based on a much shorter time window will tend to normalize a phoneme, or phoneme-in-context, differently depending upon where it occurs within a word or larger phrase.

It should be appreciated, that although it would normally be the case that the original word model will have been derived from acoustic frames that have undergone slower channel normalization than is performed on the synthesized word samples from which the new model is derived, the opposite could be true in other embodiments. Also it should be appreciated that in some embodiments the slower normalization referred in this specification and the claims that follow could be stationary normalization, that is normalization that normalizes over an entire utterance or over an entire set of utterances.

It should also be understood that many different types of channel normalization could be used with different embodiments of this aspect of the invention. In some embodiments the channel normalization could be normalization to compensate for differences in background noise, frequency response, echo, volume, and/or variance of speech signals. In different embodiments, different types of differences could exist between the channel normalization associated with new and the first model. For example, in some embodiments it is a difference in channel normalization speed. In others it is a difference in channel variance normalization.

In some embodiments of this aspect of the invention involving different channel normalization, the first word model is a phonetic word model and the new acoustic word model is a non-phonetic acoustic word model. In some such embodiments the acoustic model formed by the sequence of nodes of the non-phonetic word model has a different structure than the acoustic model formed by the sequence of nodes defined by the phonetic spelling of the given word, and the different structure involves differences other than differences in parameter values. As stated above, such differences in model structure can include differences in model complexity, such as differences in the number of model nodes and/or differences in the number of basis functions used represent probability distributions in the different models Some embodiments of this aspect of the invention do not derive non-phonetic word models from phonetic word models, but rather either derived new phonetic word models from prior phonetic word models, phonetic word models from non-phonetic word models, or non-phonetic word models from non-phonetic word models. In some such embodiments the new word models have a different structure than the word models from which they are derived, including differences in model complexity of the type described above.

According to another aspect of the present invention a somewhat similar method is provided for developing new acoustic word models from synthesized word samples. But this method is neither limited to the development of non-phonetic word models from phonetic word models, nor to the development of new word models with different associated channel normalization than the word models from which they have been derived. This method involves generating a plurality of synthesized word samples for a given word. Each such synthesized word sample includes a sequence of synthesized data samples in which one or more such data samples correspond to each of a plurality of acoustic node models in a first model of a given word, which first word model has a first model structure. Each synthesized data sample is generated from its corresponding first model node by Monte Carlo techniques using a probability distribution associated with the node. The method trains a new acoustic word model comprised of a sequence of node models for the given word from the plurality of synthesized word samples. The acoustic model formed by the sequence of nodes of the new acoustic word model has a different structure than the acoustic model formed by the sequence of nodes defined by the first word model, and the different structure involves differences other than differences in parameter values.

These differences in model structure are of the type described above. They include, for example, differences of model topology; differences of model complexity; and differences in the parameter family of basis function used in a description of such probability distributions. The differences in model complexity can include, for example, differences in the number of basis functions used to describe the probability distributions in the nodes of such word models, differences in the total number of shared node models that are used in different phoneme models (where the new and first model are both phonetic models), and differences in the number of independently defined variance values used in such word models.

According to another aspect of the present invention somewhat similar methods are provided for developing new acoustic word models from synthesized word samples, in which the word samples are generated by Monte Carlo techniques from two different word models, such as different pronunciations of different words or pronunciations of different but acoustically or functionally related words. This method involves generating a first and a second set of synthesized word samples, respectively, from a first and second word model by Monte Carlo techniques; and training a new acoustic word model comprised of a sequence of node models from synthesized word samples of both the first and second set.

In some embodiments of this aspect of the invention the first and second word models each model different pronunciations of the same word. In other embodiments the first and second word models each model pronunciations of different words. In some embodiments the first and second word models represents different multiword phrases that share one or more words in common.

In some embodiments of this aspect of the invention the sequence of node models of the new word model has a different structure than the sequence of node models of the first word model and/or the second word model, and the different structure involves differences other than differences in parameter values. In some such embodiments this different structure involves a different node topology. In some the this differences involves a different model complexity. In some it involves the use of basis functions of a different parametric family.

In some embodiments of this aspect of the invention the new word model is a non-phonetic word model and the first and/or second word model is a phonetic word model. In some such embodiments the phonetic word model is synthesized from a sequence of one or more phoneme models which have been trained from a plurality of training utterances and is determined by the phonetic spelling of a word that is not spoken in any of the training utterances, so the non-phonetic word model is derived for a word that is not spoken in the training utterances.

In some embodiments of this aspect of the invention the first and/or second word model is derived from one or more sequences of acoustic samples which have undergone a first channel normalization; a second channel normalization is performed upon the plurality of synthesized word samples to produce a corresponding plurality of modified synthesized word samples; and training the new word model from the plurality of modified synthesized word samples.

Although the various aspects of the invention described above have been described in terms of methods, the invention is also relates to computerized systems and programming recorded in machine readable form for performing such methods.

DESCRIPTION OF THE DRAWINGS

These and other aspects of the present invention will become more evident upon reading the following description of the preferred embodiment in conjunction with the accompanying drawings, in which:

FIG. 2 is a highly simplified pseudocode description of a prior art method that can be used with some embodiments of the present invention to create phonetic models from training data that has undergone relatively slow channel normalization;

FIG. 3 is a highly simplified pseudocode description of how one embodiment of the present invention similar to that illustrated in FIG. 1 creates a non-phonetic word model from synthetic word samples generated by Monte Carlo techniques from a corresponding phonetic word model created by the process shown in FIG. 2, after those synthetic word samples have undergone a channel normalization that is more rapid than that performed upon the training data used in the process of FIG. 2;

FIG. 4 is a highly simplified pseudocode description of that aspect of the invention that relates to creating non-phonetic word models from phonetic word models;

FIG. 5 is a highly simplified pseudocode description of that aspect of the invention that relates to creating word models for words that are not contained within spoken training utterances;

FIG. 6 is a highly simplified pseudocode description of that aspect of the invention that relates to creating word models designed for use with a second channel normalization from word models that have been derived using a first, different, channel normalization;

FIG. 7 is a highly simplified pseudocode description of that aspect of the invention that relates to creating a new word model that has a second model structure from a first word model that has a first model structure;

DETAILED DESCRIPTION OF PREFERRED EMBODIMENTS

Figure 1:
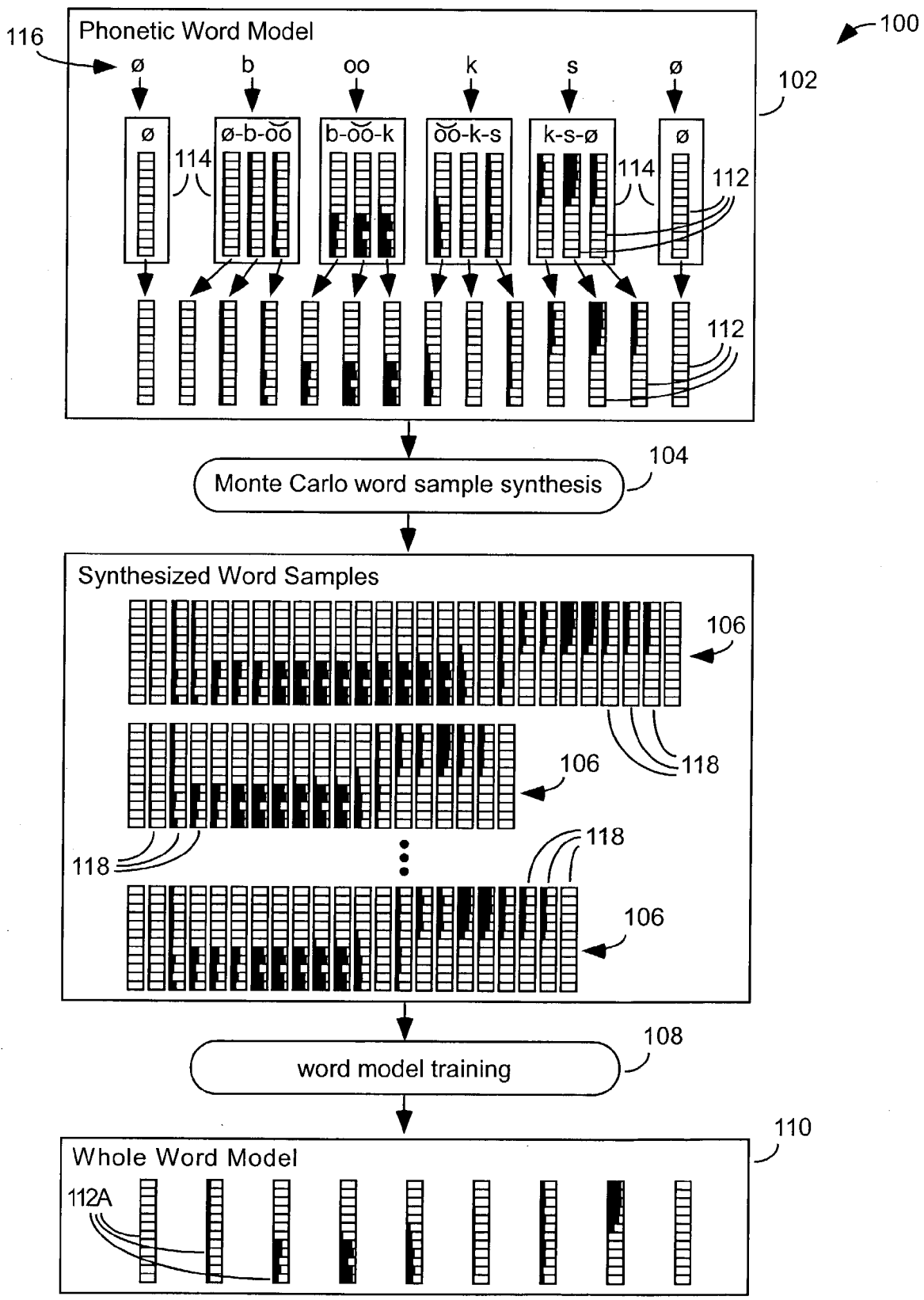
FIG. 1 is a schematic block diagram illustrating how one embodiment of the invention trains new word models from synthesized word samples generated by Monte Carlo techniques from a prior word model.

FIG. 1 illustrates how one embodiment 100 of the present invention derives a new word model 110 by performing training 108 on synthesized word samples 106 generated by Monte Carlo techniques 104 from a prior word model 102.

In the particular embodiment shown in FIG. 1 the prior word model 102 is a phonetic word model. This word model includes a sequence of node models 112, which corresponds to the model nodes of a sequence of triphone phonetic models 114, which correspond to the phonetic spelling 116 of the word model's associated word.

The Monte Carlo word sample synthesis 104 is described below in greater detail with regard to FIG. 3. It randomly generates a plurality of synthesized word samples 106, each of which has a sequence of zero or more frames 118 associated with each node 112 of the phonetic word model. Each such frame has a value for each of the frame's parameters that is randomly generated from within the probability distribution represented by its associated model node 112.

Although the frames in the samples 106 are drawn in a manner similar to the model nodes 112 and 112A in FIG. 1, it should be understood that each parameter of each model node 112 or 112A has a probability distribution associated with it, whereas each parameter of a frame in a word sample 106 has only a single value associated with it. If taken together, the parameters of a given word sample frame define a point in a multidimensional space, whereas the parameters of a given model node define a probability distribution over a hyper-volume in that same multidimensional space.

Commonly Monte Carlo techniques generate synthesized data by repeatedly randomly generating a point from within a probability distribution. Commonly each such random generation is equally likely to generate its associated point in each of a plurality of areas or volumes of the probability distribution that have equal probability according to that distribution, so that, after enough samples have been generated, the resulting sets of such samples will tend to have a distribution of values corresponding to the probability distribution from which they have been generated. The inventors of the present application have found that word models that have been trained from approximately three hundred synthesized word samples tend to have recognition scores virtually as high as word models that have been trained from a much larger set of synthesized word samples or word models that have been trained from a much larger set of training utterances.

As will be described below with regard to FIGS. 2 and 3, in some embodiments of the invention the phonetic word model 102 has acoustic models that have been derived from training data according to prior art techniques, such as those described in the above-mentioned U.S. Pat. No. 5,715,367, from sequences of frames of training data that have been subjected to stationary or relatively slow channel normalization. In many such embodiments the synthesized word samples are subjected to a substantially faster channel normalization, which would often be more appropriate for use in a discrete utterance recognizer.

Once the synthesized word samples 106 have been modified by having their frames 118 submitted to such a fast channel normalization process, the resulting synthesized word samples are used by the word model training algorithm 108 to produce new whole-word model 110. The word model-training algorithm 108 shown in FIG. 1 can be virtually any prior art word model-training algorithm that is compatible with the data structure of the synthesized word samples.

FIG. 2 is a highly simplified pseudocode description of a prior art algorithm 200 for training phonetic models, which is similar to that described in the above-mentioned U.S. Pat. No. 5,715,367, except that it specifies that the sequence of acoustic parameter frames used to represent training utterances undergo a slow channel normalization process.

The algorithm 200 includes a function 202 that receives acoustic samples of training utterances. The samples are in the form of sequences of acoustic parameter frames, each of which represents the values of one of a plurality of acoustic parameters derived from a corresponding training utterances for a given point in time.

Next function 204 performs slow channel normalization upon the frames of such acoustic samples. In some embodiments such slow channel normalization will be stationary channel normalization that normalizes based on the average acoustic characteristics of an entire individual training utterance, or of a set of training utterances. In other embodiments the slow channel normalization is based on a portion, or moving window, of the training utterance or set of utterances, rather than using the entire utterance or set of utterances as above. This channel normalization is termed "slow" because it averages over a relatively long window of speech, and is expected to change slowly over the course of the utterance. As has been stated above, relatively slow channel normalization tends to be preferred in acoustic data used to train phonetic models because, since it is more stable, it tends to cause the acoustic samples corresponding to a given phoneme, or phoneme-in-context, to be less affected by the location within a training utterance at which such a phoneme or phoneme-in-context occurs.

It should be appreciated, that in some embodiments of the invention the process of performing slow channel normalization could be performed on acoustic samples in a pipelined manner as they are being received, while in others such slow channel normalization could be performed on a set of training utterances in a batch process.

Function 206 stores a large vocabulary dictionary of phonetic spellings. These phonetic spellings are used by function 208 to create phonetic models of words in the training vocabulary contained within training utterances received in function 202. Function 208 trains these phonetic models from the frames of the training utterance corresponding to their words.

Once a plurality of such phonetic word models have been trained with the training utterances, function 210 clusters acoustic node models from such phonetic word models into node model groups or clusters, in the manner described in detail in the above-mentioned U.S. Pat. No. 5,715,367. Such clustering is not essential to the present invention, but it does have several important advantages. It reduces the number of acoustic node models necessary to model all possible phonemes, or phonemes-in-context. As stated above, it also has the benefit of increasing the amount of training data that can be used to train each phonetic node model given a fixed amount of training utterances, and it has the benefit of enabling acoustic models to be created for triphone model nodes of phonemes-in-context for which no, or very little, training data might exist.

Once the clustering of function 210 is been performed, function 212 associates the model associated with each acoustic node model group produced by function 210 with each node of each phonetic model contained in that node model group.

Once the above process has been performed for all phonemes, a phonetic model can be created for any phonetic spelling in the dictionary mentioned with regard to function 206 by merely concatenating the node models contained in the phoneme models associated with each phoneme in such a phonetic spelling.

FIG. 3 is a highly simplified pseudocode description of an algorithm 300 for creating new word models from phonetic word models of the type created in FIG. 2.

The algorithm 300 includes a loop 302 that is performed for each word for which such a new word model is to be created.

Loop 302 contains a function 304 that creates a phonetic word model by concatenating phoneme models associated with the current word's phonetic spelling. This corresponds to the phonetic word model 102 shown in FIG. 1.

Next the loop 302 includes a subloop 306, which is performed for each of a plurality of synthetic word samples to be generated for the current word.

Loop 306 includes a sub-subloop 308 and a function 320. This sub-subloop 308 is performed for each node 112 in the phonetic model 102, shown in FIG. 1.

Subloop 308 includes a function 310 that uses Monte Carlo techniques to generate a frame duration for the current model node 112 based on the node's duration probability distribution. In this particular embodiment it is assumed that each phonetic node model 112 has associated with it a duration probability distribution that indicates the likelihood for an utterance of its corresponding phoneme to have sound corresponding to the current phonetic node model that occurs for each of a different number of possible frame durations. It is this duration probability model that is used to randomly select a frame duration for the current phonetic node of the current synthetic word sample.

Once a such frame duration has been randomly selected, a subloop 312 of the sub-subloop 308 is performed for each of the number of frames associated the selected frame duration. This subloop 312 includes a sub-subloop 314 that performs function 316 for each parameter of the current model node. Function 316 uses the Monte Carlo techniques to generate a single value for that parameter based on the parameters probability distribution. Once the subloop 314 has been performed for each parameter of the model node, function 318 saves the values generated by function 316 for all of the node's parameters as a synthesized frame 118, of the type shown in the middle of FIG. 1.

Once the loop 308 has been performed for each node in the phonetic model during the generation of a given synthetic word sample, function 320 saves the sequence of synthesized frames generated for all such nodes as a synthesized word model 106, of the type shown in FIG. 1.

Once the loop 306 has generated all of the synthetic word samples that are to be generated for a given word, function 322 modifies each such synthetic word model by performing fast channel normalization upon it. Of course, it should be appreciated that in some embodiments of the invention each synthetic word sample can have such fast channel normalization performed upon as it is created, while other embodiments might wait until a batch of such synthetic word samples have been created before performing such fast channel normalization upon them.

Once the synthetic word samples 106 of the type shown in FIG. 1 have had fast channel normalization performed upon them, function 324 uses the modified synthesized word samples to train a non-phonetic word model for that word using any appropriate word model training routine. Of course, it should be appreciated that in other embodiments of the invention the training of such a non-phonetic word model can be performed upon each successive modified synthesized word sample as it is created.

As indicated by the loop 302 near the top of FIG. 3 this process of creating a non-phonetic word model from a phonetic word model by use of Monte Carlo techniques can be repeated for each of a plurality of words. Although the algorithm shown in FIG. 3 can be used to train up large vocabulary systems, traditionally non-phonetic word models are used in smaller vocabulary systems.

FIGS. 4, 6, and 7 illustrate three different aspects of the present invention. Each of these different aspects of the invention can be used separately, or in combination with one or both of the others.

FIG. 4 is a highly simplified, and highly generalized, pseudocode description of a process 400 of creating non-phonetic word models from phonetic word models using Monte Carlo techniques of the general type described above with regard to FIG. 3. The more general description included in FIG. 4 is included in this application to indicate that its corresponding aspect of the invention need not be limited to all the details included in FIG. 3. Its key features are a function 402 that generates synthesized samples of a word to be trained from phonetic word models using Monte Carlo techniques, and a second function 404 that trains whole word models from such synthetic word samples.

The process of FIG. 4 can be used either with or without the features shown in the processes of FIGS. 5 through 7.

The process of FIG. 4 can be used to create non-phonetic word models from phonetic word models for words that are not in the training utterances used to train the phonetic word models, as is shown in the process 500 of FIG. 5.

The process of FIG. 5 includes a function 502 that trains phonetic word models from words contained in a set of training utterances. This function is similar to the function 208 described above regard to FIG. 2. The function 504 derives phoneme models from acoustic node phonetic models based on clustered components. This is similar to functions 210 and 212 described above regard to FIG. 2. Then function 506 creates a phonetic word model of a new word that is not in the training utterances. This can be done because phonetic word models are created from phonetic spellings, such as the phonetic spelling 116 shown in FIG. 1, rather than from actual utterances of an individual word. Next function 508 uses Monte Carlo techniques to develop synthesized word samples of the new word. Then function 510 trains a non-phonetic word model from the synthesized word samples of the new word.

The process of FIG. 5 is particularly valuable in many command-and-control or toy control applications. This is because such applications commonly involve non-phonetic word models, and they often have recognition vocabularies that include rare or made-up words, such as words concatenated from other words.

Prior art methods of creating non-phonetic word models from phonetic word models by concatenating acoustic nodes from a phonetic word models could be used to create word models for words not contained within the training utterances used to create such phonetic models. But such prior art methods would not be able to support the novel features of the methods contained in FIGS. 6 and 7, which allow the new word model to have a different channel normalization or different structure than the model it is derived from. The present invention also makes it easy to create a new word model that has the same structure as, but a different data format than, the word model it is derived from without requiring the need for any format conversion software to be written, provided there is a training algorithm for training a word model with the new format from word samples created by the Monte Carlo technique.

FIG. 6 is a highly simplified, and highly generalized, pseudocode description of a process 600 for creating and using a new word model trained from training samples having a second channel normalization, which training samples are derived from an original word model that has been trained from data having a first, different, channel normalization.

FIG. 6 includes a function 602 that trains a first word model for a given word from a plurality of samples of acoustic data that have undergone a first channel normalization. It includes a function 604 that generates synthesized samples of words from such a first word model using Monte Carlo techniques. It further includes a function 606 that performs a second channel normalization on the plurality of synthesized word samples to produce a corresponding plurality of modified synthesized word samples. The method of FIG. 6 also includes a function 608 that trains a new acoustic word model for the word from the modified synthesized word samples.

These functions 602 through 608 are used to create a new word sample and can be performed separately (and on separate computers) from the following functions 610 through 614 that use such a newly created word sample in speech recognition upon data that is normalized using the second normalization. Function 610 receives an utterance to be recognized. Function 612 performs the second channel normalization upon data representing that utterance. Then function 614 recognizes a word from the normalized data using the new acoustic model trained by function 608.

FIG. 7 is a highly simplified, and highly generalized, pseudocode description of a process 700 for creating a word model having a second model structure from a word model having a first model structure using Monte Carlo techniques. It includes a function 702 that generates synthesized samples of words from the word model having the first model structure using Monte Carlo techniques. It includes a second function 704 that trains a new acoustic word model for the word having a different, second, model structure from the plurality of synthesize word samples.

Such differences in model structure include differences in model complexity. As stated above, this includes differences in the number of acoustic model nodes included in the different models. Such a difference in the number of model nodes is indicated in FIG. 1, where the phonetic word model 102 in that particular embodiment includes a larger number of acoustic model node 112 then the word model 110 shown near the bottom of that figure, which has fewer model node 112A.

Figure 8:
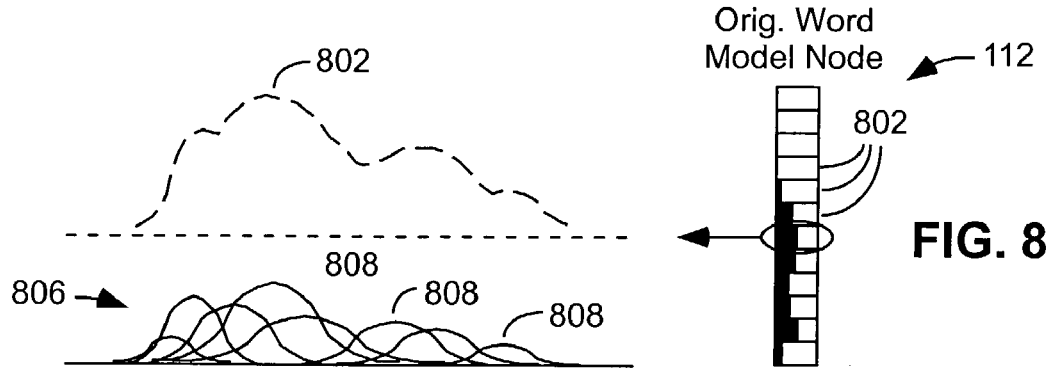
FIG. 8 is a schematic representation of the probability distribution associated with an acoustic model node of an original word model that has a first probability model structure.
Figure 9:
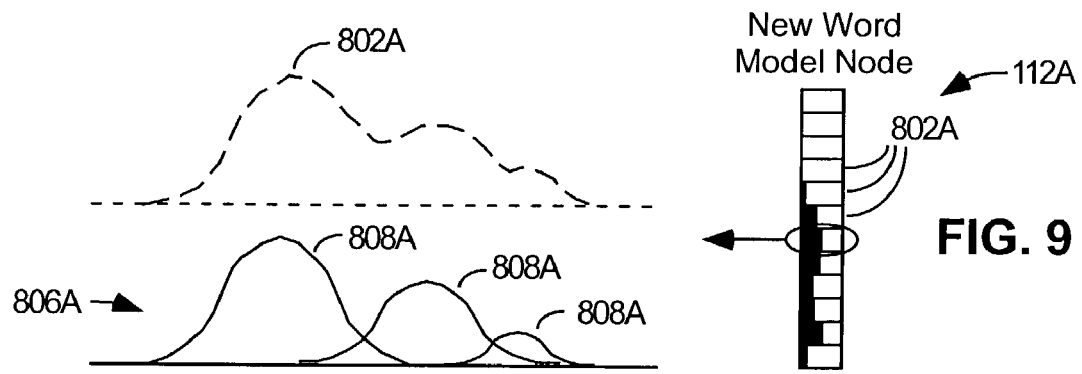
FIG. 9 is a schematic representation of a new word model node that has a probability distribution with a model structure that is different than the first model structure shown in FIG. 8 because it has fewer basis functions.

Such differences in model complexity can also include differences in the number or parametric family of basis functions, as is illustrated with regard to FIGS. 8 and 9.

FIG. 8 illustrates an original word model node 112 that includes a plurality of probability distributions 802 corresponding, respectively, to a plurality of different parameters. When taken together, the probability distribution for all such parameters can be viewed as a multidimensional probability distribution. The probability distribution 802 of the parameter encircled in FIG. 8 is graphed with a dotted line. In the original node model shown in FIG. 8, each such probability distribution 802 is actually represented by a set 806 of eight Gaussian basis functions 808.

FIG. 9 illustrates one type of difference in model structure that a new word model node 112A derived from synthesized word models generated from the model node shown in FIG.

8 can have according to the method of FIG. 7. In this word model node each of the parameter probability distributions 802A is represented by a set of basis functions 806A that contains a smaller number of individual basis functions 808A, causing each such probability distribution 802A to be less capable of accurately representing probability distributions having complex or irregular shapes. But as has been stated above, a word model having nodes with probability distributions represented by fewer basis functions has the advantage of requiring less computation during speech recognition and less memory space for storage.

Figure 10:
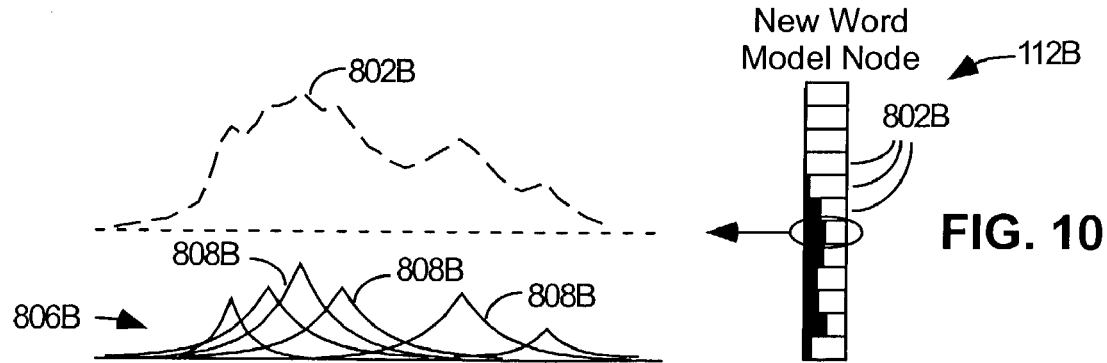
FIG. 10 is a schematic representation of a new word model node that has a probability distribution with a model structure that is different than the first model structure shown in FIG. 8 because it uses a different parametric family of basis function.

FIG. 10 illustrates another type of difference in model structure that can be used in some embodiments of the method of FIG. 7, that is, a difference in the parametric family of the basis functions used. The new word model node 112B shown in FIG. 10 includes a probability distribution 802B for each of its parameters, one of which is shown in graphical form by a dashed line in FIG. 10. This probability distribution is represented by a set of Laplacian basis function, 808B, rather than by Gaussian basis functions 808, shown in FIG. 8, of the type used in the original word model from which the basis functions of FIG. 10 have been derived.

The process of FIG. 4 provides an easy way for using one set of phonetic word models to train up any of many different types of word models. This includes training up word models that have the same model structure as the phonetic word models, but have a different data format for representing that same model structure. Thus, the method of FIG. 4 can be used to provide a convenient method for creating non-phonetic word models from phonetic word models that is independent of the data format of the phonetic word models.

Similarly the process shown in FIG. 6 can be used in combination with the features shown in the processes in FIGS. 4, 5, and/or 7, or it can be used without them. For example the method of FIG. 6 can be used to create new non-phonetic models from prior non-phonetic models, or to create new phonetic models from prior phonetic models. The process of FIG. 6 can also be used to create new word models that have the same model structure as the prior models from which they are constructed, as well as to create new word models that have a different model structure from the models from which they are derived. Wherever it is desirable to train up word models for use in situations where a different form of channel normalization will be used than that which has been used to create an already existing set of word models, the method of FIG. 6 can be used to create such new word models from such already existing models.

The process shown in FIG. 7 can be used in combination of features of FIGS. 4, 5, and/or 6, or it can be used without them. The process shown in FIG. 7 can be beneficially used wherever is desirable to create a set of one or more word models having a different model structure than an already existing set of word models.

Although the process of FIG. 7 can be used to create word models having a more complex model structure from word models having a more simple model structure, it is likely that its more common use will be to create word models having equal or lesser complexity than the word models from which they are derived. This is because the accuracy of the synthesized word samples generated by the Monte Carlo techniques from a previous word model will tend to be limited by the accuracy of the previous word model, and, thus, the accuracy of a new word model generated from such synthesized word samples will tend to be limited to the accuracy of the previous word model. But, for example, word models with a more complex structure could be derived using aspects of this invention from word models with a less complex structure for the purpose of creating initial parameters for a set of complex models which are to be subsequently trained or adapted with more training data.

One of the preferred ways of using the method of FIG. 7 is to have the initial word models have a relatively high degree of model complexity, so that synthesized word samples generated from such initial word models will be capable of properly training new word models having most different desired levels of model complexity. As is been stated above in the summary of the invention, word models with lesser model complexity often have the advantage of requiring fewer computational resources and/or less storage for use in speech recognition.

Figure 11:
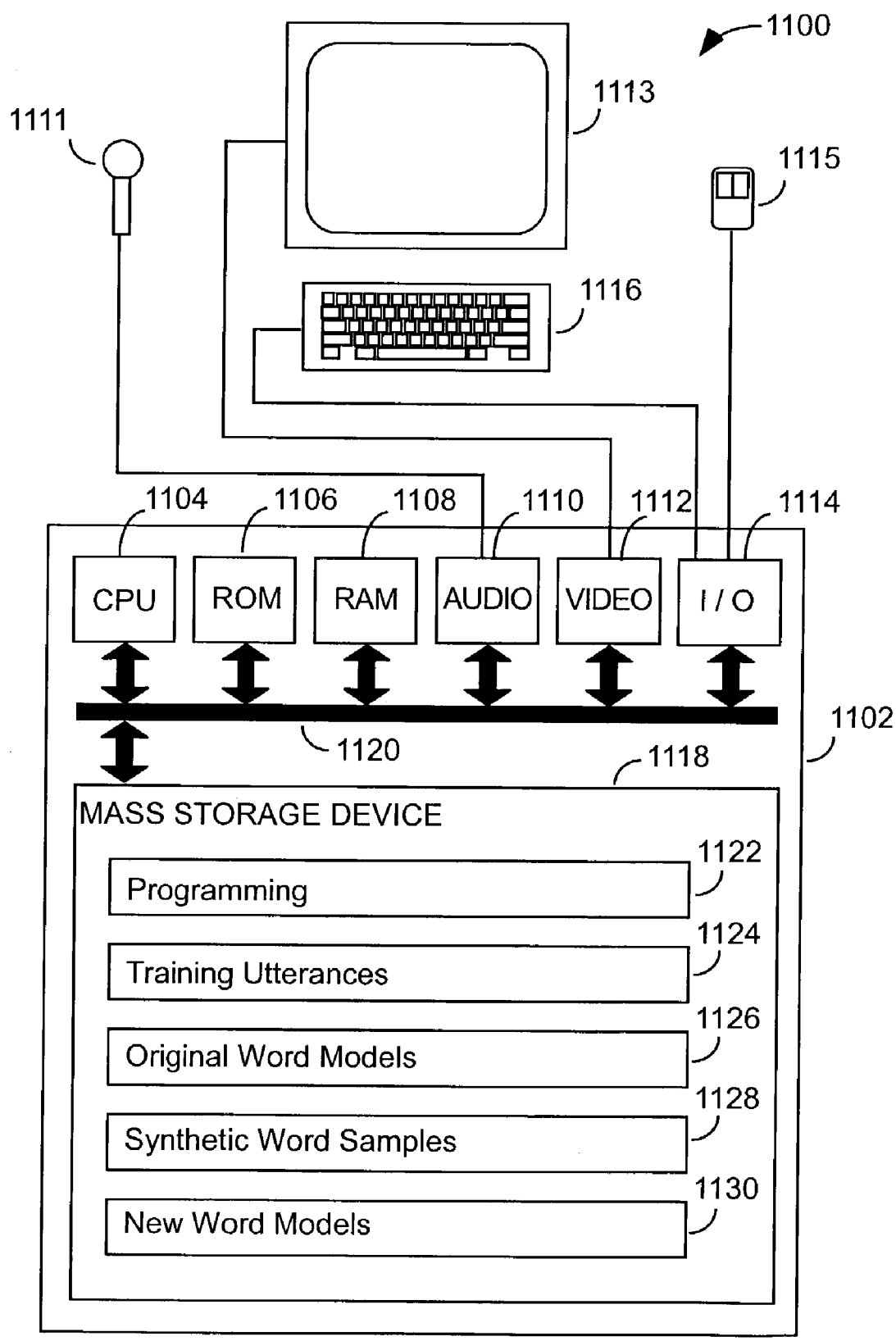
FIG. 11 is a schematic representation of one of the many types of computing systems that can be used to perform the functions of the present invention.

FIG. 11 illustrates one of many different types of computing systems that can be used to perform the above-described methods. The computing system 1100 shown in FIG. 11 includes a computer 1102 that includes a CPU 1104 for executing instructions stored in its memory; ROM 1106 and/or RAM 1108 that store instructions to be executed by the CPU and data that can be read or written by the CPU; an audio input circuit 1110 that can be used to receive input from a microphone 1111 for receiving training utterances to be used by the system; a video interface 1112 for interfacing with a video display 1113; I/O device 1114 for receiving input from input devices such as a mouse 1115 and/or a keyboard 1116; and a mass storage device 1118. All these elements of the computer are connected together by one or more buses 1120

The mass storage device includes programming 1122 that includes programming for performing the functions of the methods described above that are included on the particular computer system 1100. The mass storage device can also include training utterances 1124 when the system is used with methods that require such training utterances. The mass storage device can also store original word models 1126, which can, in some embodiments, correspond to models such as the model 102 shown in FIG. 1. The mass storage device can also store synthetic word samples 1128, such as the synthetic word samples 106 shown in FIG. 1. The mass storage device can also include new word models 1130, such as the new word model 110 shown in FIG. 1.

FIGS. 12 through 15 illustrate other aspects of the present invention in which synthesized word samples generated by Monte Carlo techniques for each of two different word models are used to train a new word model.

Figure 12:
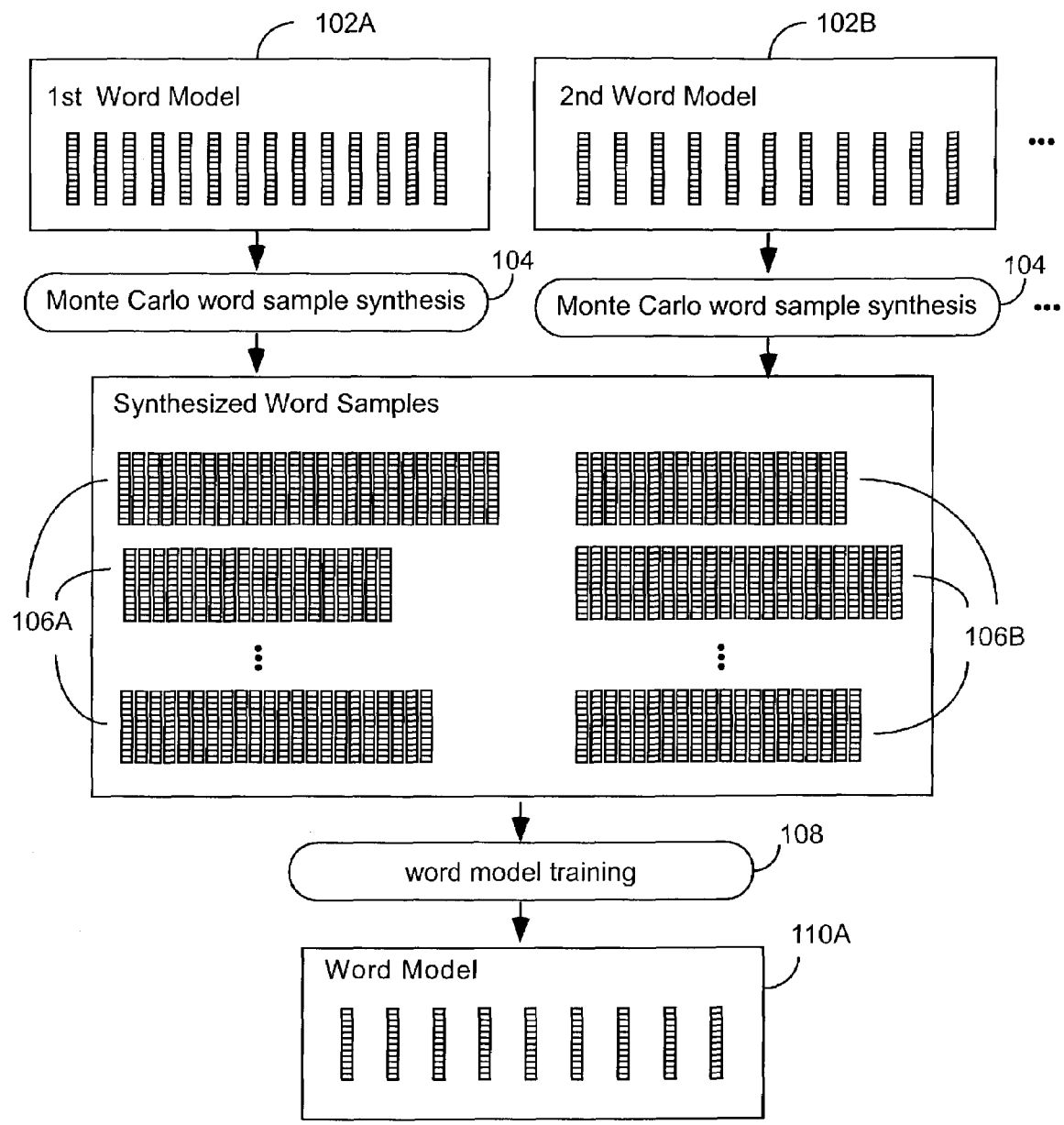
FIG. 12 is a schematic block diagram illustrating how one embodiment of the invention trains a new word model from synthesized word samples generated by Monte Carlo techniques from two separate prior word models.

FIG. 12 illustrates this aspect of the invention in its more general form. Monte Carlo techniques 104 like those shown in FIG. 1 are used to synthesize word samples from two or more initial word models, such as the word models 102A and 102B shown in FIG. 12.

The synthesized word samples 106A generated from the first word model 102A and the synthesized word samples 106B generated from the second word model 102B are both used by a training algorithm 108, similar to the training algorithm shown in FIG. 1, to train up a new word model 110A shown FIG. 12.

Figure 13:
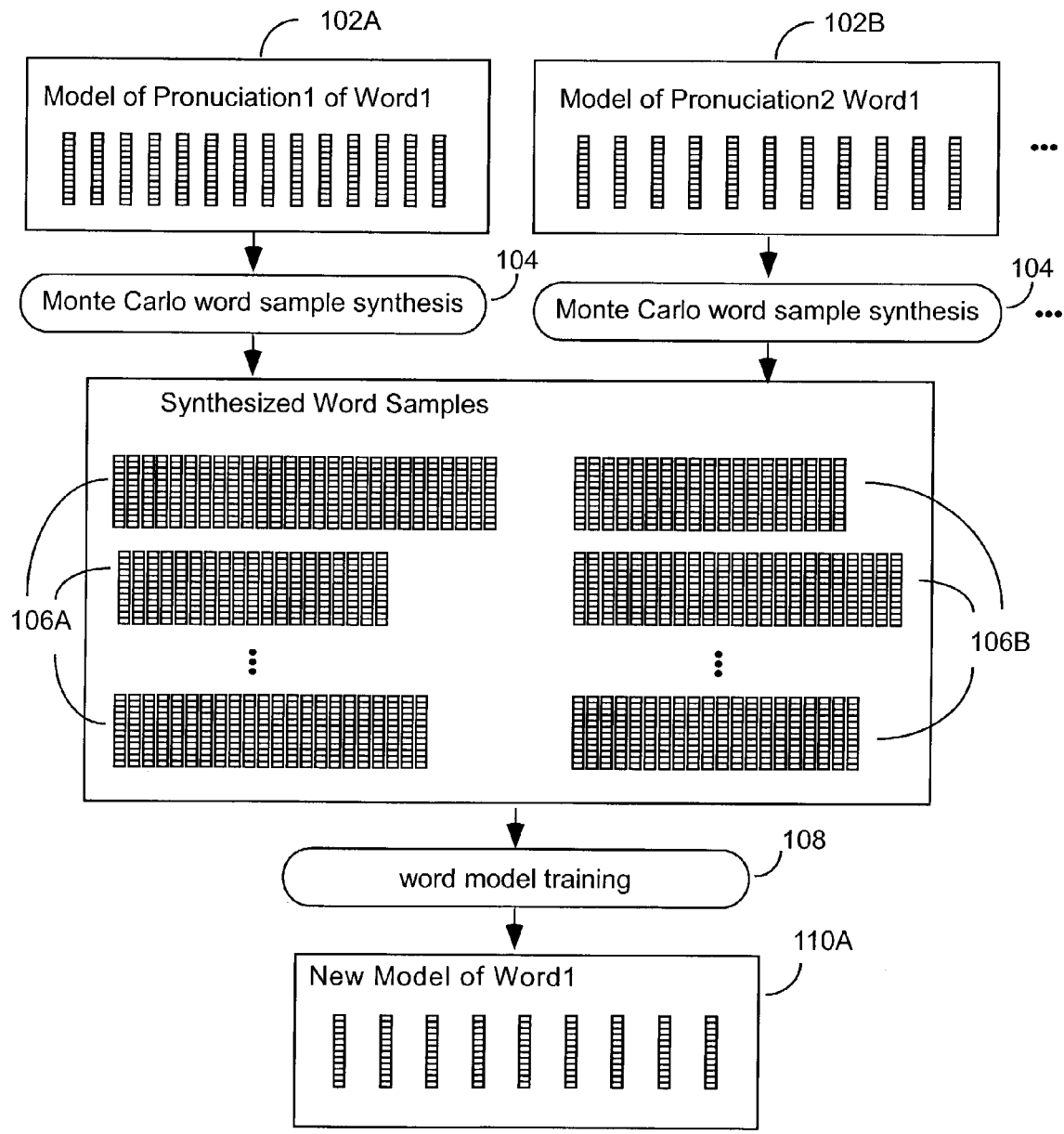
FIG. 13 is a schematic block diagram similar to FIG. 12 in which the two separate prior word models are models of two different pronunciations of the same word.

FIG. 13 is identical to FIG. 12 except that in it the two or more initial word models 102A and 102B are models of different pronunciations of the same word, and the new word model 110A is a model of that same word that blends together the separate acoustic features of the different pronunciations of the models 102A and 102B.

For example, it is common in many large vocabulary speech recognition systems to have multiple models to reflect common different pronunciations of an individual word. For example, the word "going" might have separate word models for the word spoken with all of its letters pronounced and a separate word model for the word pronounced as if it were spelled "goin'". As another example, the word "to" might have separate word models for when it is pronounced "to" and when it is pronounced "ta", as it is often spoken as part of a continuous phrase.

The creation of a new word model 110A such as that shown in FIG. 13, which blends acoustic features of separate pronunciations of the same word, has the benefit of enabling a vocabulary, representing a given set of words to be recognized, to be represented with fewer word models. This is valuable in speech recognition applications where it is desirable to reduce the computation and/or memory required.

This technique is particularly desirable in relatively small vocabulary applications (and particularly discrete recognition small vocabulary applications) where one or more word models are allowed to be a blend of multiple different pronunciations of a given word. In such small vocabulary applications the somewhat blurred acoustic word models that result from having been trained from multiple different pronunciations can often be recognized with accuracy because in such a small vocabulary the acoustic features of most words are often quite distinct. One can think of an acoustic word model as a probability distribution in a high dimensional acoustic space. If there are relatively few word models in such a space, each one tends to be further from the others, thus making it is easier to properly associate an utterance with its corresponding word model, even if that model has been somewhat blurred by the fact that it represent two or more different pronunciations. Tests can be performed to determine which words in a given vocabulary can have their different pronunciations blended without substantially reducing recognition performance.

Figure 14:
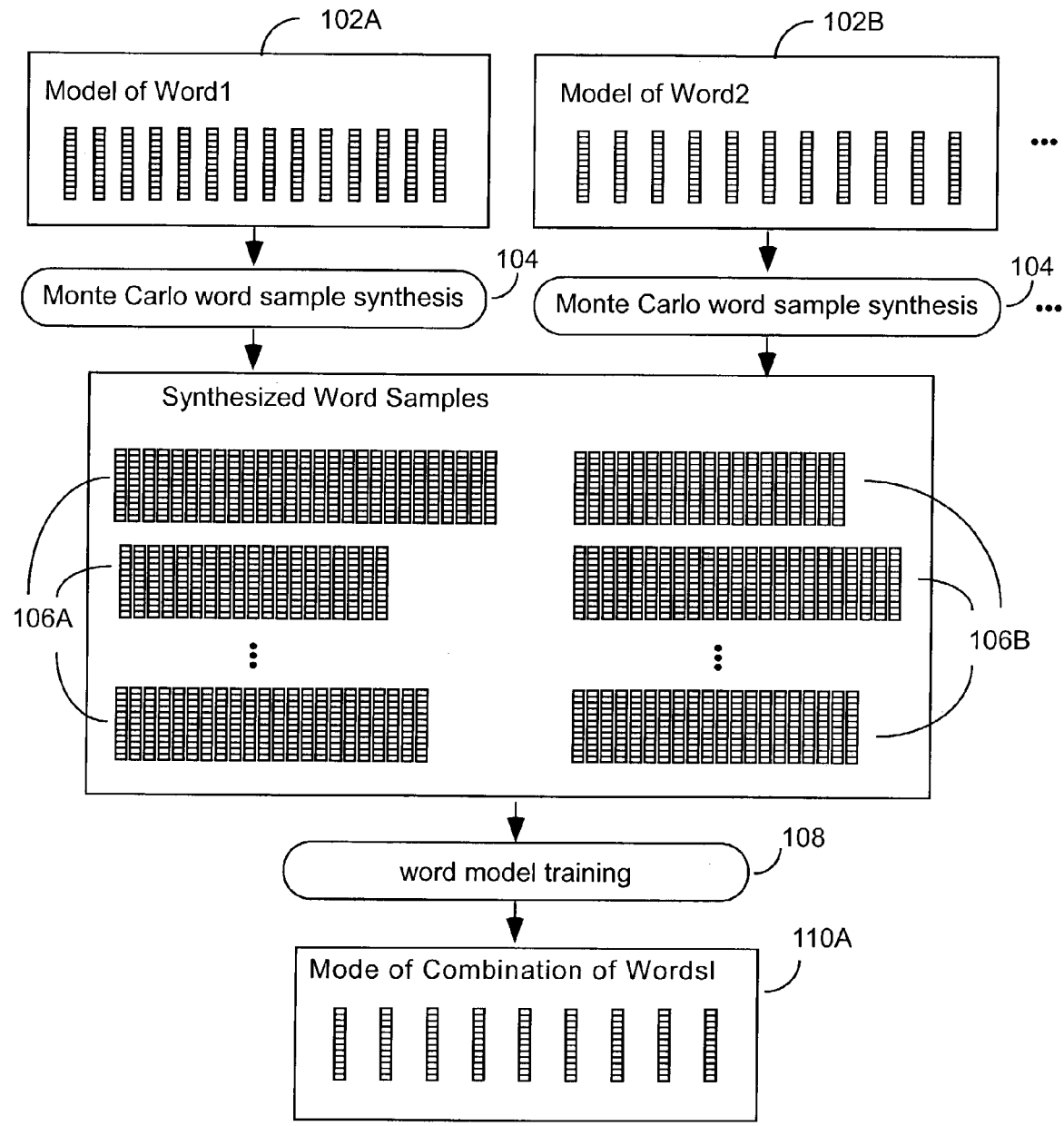
FIG. 14 is a schematic block diagram similar to FIG. 12 in which the two separate prior word models are models of two different words.

FIG. 14 is identical to FIG. 12 except that in it the two or more initial word models 102A and 102B are models of different words and the new word model 110A produced by the method is a multiword word model representing a blend of acoustic features from such different words.

A multiword word model, such as that produced by the method of FIG. 14, can have multiple applications. For example, in speech recognition used for command and control it is common to have a given command phrase treated as an individual word for which there a given word model. It is not uncommon for users to forget the exact wording of many such command phrases, and, thus, to add, delete, and/or replace certain words in the utterance of such a command sequence. For example, if the command is supposed to be "turn the lights off", many users might say "turn lights off", "turn off the lights", "turn the light off", etc. Designers of a speech recognition system might well decide to represent each of these different misstatements of the command phrase with a different initial word model, such as the word models 102A and 102B shown in FIG. 14, and to train up one common word model 110A of the type shown in FIG. 14 to represent all such phrases. This would reduce the computation or memory space required to recognize such different versions of the command.

Testing could be done to determine which of different wordings of a command could be represented by a common word model without suffering too great a loss in recognition accuracy. Such multiword word models might also be used to represent different grammatical forms of a given command word, such as plural or singular versions of that word and/or versions of the word having different grammatical tense.

A multiword word model 110A such as that produced by the method of FIG. 14 can have other uses. For example, it could be used to represent combinations of different words or word parts which might be used for filtering in the recognition process. That is, initial recognition might be performed against such multiword models, and then the recognized multiword model would have recognition performed upon its associated individual word models.

Figure 15:
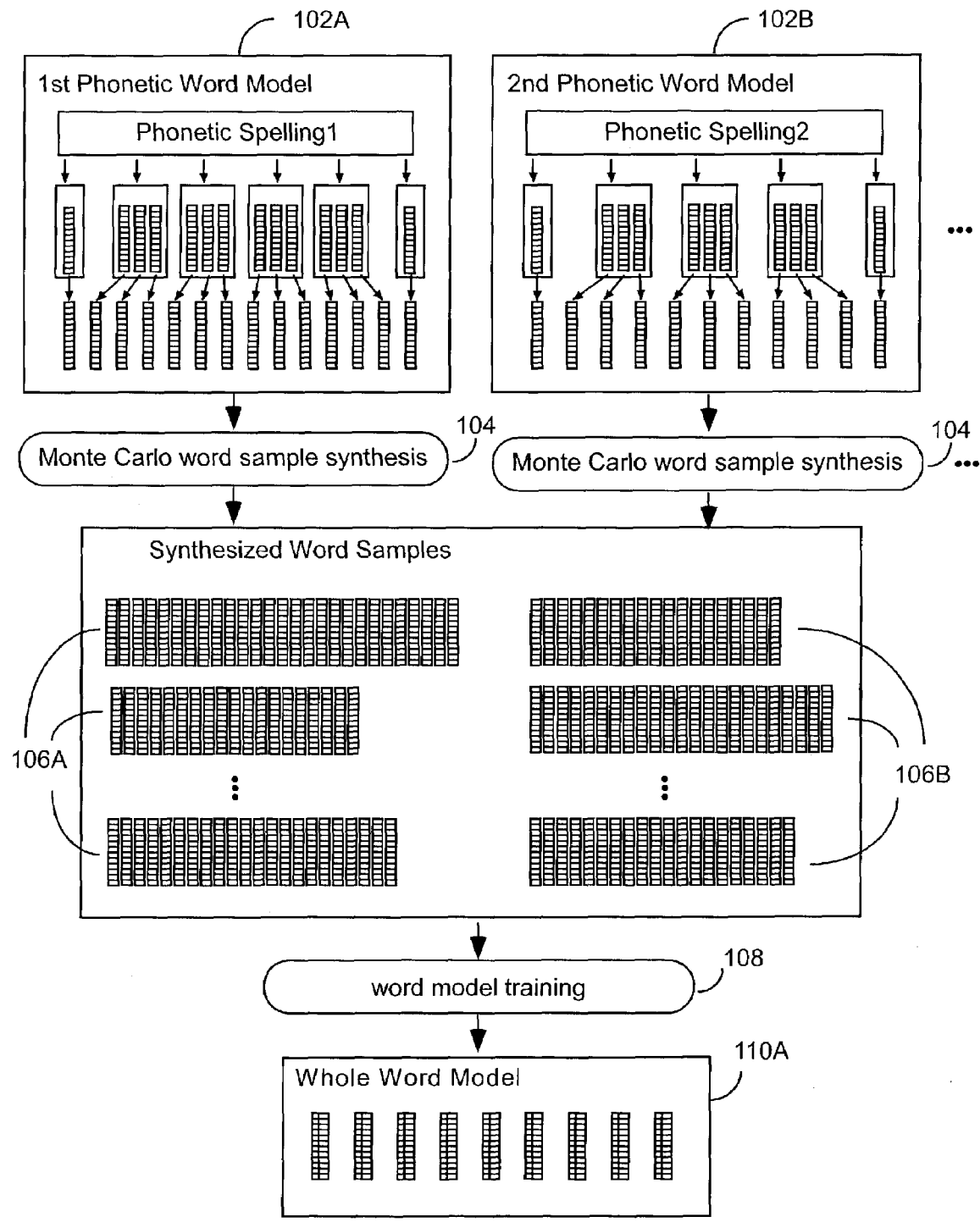
FIG. 15 is a schematic block diagram similar to FIG. 12 in which the two separate prior word models are phonetic models having different phonetic spellings.

FIG. 15 is identical to FIG. 12, except that in it the two or more initial word models, such as the models 102A and 102B, are phonetic word models and the new word model 110A produced by the method is a whole word model. It should be appreciated that such deriving of whole word models from phonetic word models through Monte Carlo synthesis can be applied in the methods of FIGS. 12 through 14. It should also be understood that in other embodiments of this aspect of the invention the initial word models 102A and 102B shown in FIGS. 12 through 14 could be whole word models and the new word model 110A could be either a whole word model or a phonetic word model.

It should be understood that the foregoing description and drawings are given merely to explain and illustrate the invention and that the invention is not limited thereto except insofar as the interpretation of the appended claims are so limited. Those skilled in the art who have the disclosure before them will be able to make modifications and variations therein without departing from the scope of the invention.

For example, the broad functions described in the claims below, like virtually all computer functions, can be performed by many different programming and data structures, and by using different organization and sequencing. This is because programming is an extremely flexible art form in which a given idea of any complexity, once understood by those skilled in the art, can be manifested in a virtually unlimited number of ways.

Furthermore, it should be understood that the invention of the present application is not limited to use with any one type of operating system, computer, or speech recognition system. For example, it is not limited to use on Von Neumann computers, but could be used on non-Von Neumann computers as well. Its features can be used on multi-processing computers, including massively parallel ones, neural net computers, as well as computers using different types of device physics, such as quantum effect devices or biochemical devices, to accomplish their computations. The present invention could be used with both continuous and discrete speech recognition systems, and with speech recognition systems that use other schemes for representing utterances to be recognized and other schemes for representing vocabulary words than mixture models formed of weighted Gaussian distributions.

We claim:

1. A method of developing non-phonetic acoustic word models for use in speech recognition comprising:

generating a plurality of synthesized word samples for a given word, each of which includes a sequence of synthesized data samples in which one or more such data samples correspond to each of a plurality of nodes in a sequence of acoustic phonetic models corresponding to the phonetic spelling of the given word, where each synthesized data sample is generated from its corresponding phonetic model node by Monte Carlo techniques using a probability distribution associated with said node;

training a non-phonetic whole-word acoustic word model comprised of a sequence of nodes for the given word from said plurality of synthesized word samples.

2. A method as in claim 1 wherein the acoustic model formed by the sequence of nodes of the non-phonetic word model has a different structure than the acoustic model formed by the sequence of nodes defined by the phonetic spelling of the given word, and said different structure involves differences other than differences in parameter values.

3. A method as in claim 2 wherein the non-phonetic acoustic word model has a different node topology than the sequence of phonetic model nodes defined by the phonetic spelling of the given word.

4. A method as in claim 2 wherein the individual acoustic node models of the non-phonetic word model have a different complexity than the individual acoustic node models of the word model defined by the phonetic spelling of the given word.

5. A method as in claim 4 wherein:
the acoustic node models of both the non-phonetic and phonetic word model represent a probability distribution for the value of each of a plurality of parameters, each of which probability distributions is defined as the combination of a plurality of basis functions; and
the probability distributions of the nodes of the non-phonetic word model are represented by a different number of basis functions than the probability distributions of the phonetic word model from which said synthesized word samples are derived.

6. A method as in claim 2 wherein:
the acoustic node models of both the phonetic and non-phonetic word model represent a probability distribution for the value of each of a plurality of parameters, each of which probability distributions is defined as the combination of one or more probability distribution basis functions of a given parametric family; and
the probability distributions of the nodes of the non-phonetic word model are represented by one or more probability distribution basis functions of a different parametric family than the one or more probability distribution basis functions used in the phonetic word model from which said synthesized word samples are derived.

7. A method as in claim 1 wherein:
said phonetic word model is synthesized from a sequence of one or more phoneme models which have been trained from a plurality of training utterances; and
said phonetic word model is determined by the phonetic spelling of a word which is not spoken in any of said training utterances, enabling said non-phonetic word model to be derived for a word which is not spoken in said training utterances.

8. A method of developing acoustic word models for use in speech recognition comprising:
generating a plurality of synthesized word samples for a given word, each of which includes a sequence of synthesized data samples in which one or more such data samples correspond to each of a plurality of acoustic node models in a first word model of a given word, where each synthesized data sample is generated from its corresponding first model node by Monte Carlo techniques using a probability distribution associated with said first model node;
wherein said first word model is derived from one or more sequences of acoustic samples which have undergone a first channel normalization;
performing a second channel normalization upon said plurality of synthesized word samples to produce a corresponding plurality of modified synthesized word samples; and
training a new acoustic word model comprised of a sequence of nodes for the given word from said plurality of modified synthesized word samples.

9. A method as in claim 8 wherein:
said first channel normalization has a given rate of change; and
said second channel normalization has a rate of change which is faster than the rate of change of said first channel normalization.

10. A method as in claim 8 further including:
receiving a sequence of acoustic samples of speech sounds to be recognized;
performing a third channel normalization upon said sequence of acoustic samples to be recognized; and
performing speech recognition by comparing said sequence of acoustic samples to be recognized against a plurality of word models including said new acoustic word model;
wherein said second channel normalization is selected to have characteristic corresponding to the third channel normalization.

11. A method as in claim 8 wherein:
said first word model of the given word is a sequence of acoustic phonetic models corresponding to the phonetic spelling of the given word; and
said new acoustic word model is a non-phonetic acoustic word model.

12. A method as in claim 11 wherein the acoustic model formed by the sequence of nodes of the non-phonetic word model has a different structure than the acoustic model formed by the sequence of nodes defined by the phonetic spelling of the given word, and said different structure involves differences other than differences in parameter values.

13. A method as in claim 12 wherein the individual acoustic node models of the non-phonetic word model have a different complexity than the individual acoustic node models of the word model defined by the phonetic spelling of the given word.

14. A method as in claim 13 wherein:
the acoustic node models of both the non-phonetic and phonetic word models represent a probability distribution for the value of each of a plurality of parameters, each of which probability distributions is defined as the combination of a plurality of basis functions; and
the probability distributions in the nodes of the non-phonetic word model are represented by a different number of basis functions than the probability distributions in the phonetic word model from which said synthesized word samples are derived.

15. A method as in claim 8 wherein the acoustic model formed by the sequence of nodes of the new acoustic word model has a different structure than the acoustic model formed by the sequence of nodes defined by the first word model, and said different structure involves differences other than differences in parameter values.

16. A method as in claim 15 wherein the individual acoustic node models of the new word model have a different complexity than the individual acoustic node models of the first word model.

17. A method as in claim 16 wherein:
the acoustic node models of both the first and new word models represent a probability distribution for the value of each of a plurality of parameters, each of which probability distributions is defined as the combination of a plurality of basis functions; and the probability distributions in the nodes of the new word model are represented by a different number of basis functions than the probability distributions in the first word model from which said synthesized word samples are derived.

18. A method of developing acoustic word models for use in speech recognition comprising:

generating a plurality of synthesized word samples for a given word, each of which includes a sequence of synthesized data samples in which one or more such data samples correspond to each of a plurality of acoustic node models in a first model of a given word having a first model structure, where each synthesized data sample is generated from its corresponding first model node by Monte Carlo techniques using a probability distribution associated with said node; and training a new acoustic word model comprised of a sequence of node models for the given word from said plurality of synthesized word samples;

wherein the acoustic model formed by the sequence of nodes of the new acoustic word model has a different structure than the acoustic model formed by the sequence of nodes defined by the first word model, and said different structure involves differences other than differences in parameter values.

19. A method as in claim 18 wherein the new word model has a different node topology than the sequence of nodes defined by the first word model.

20. A method as in claim 18 wherein the new word model has a different model complexity than the first word model.

21. A method as in claim 20 wherein:

the acoustic node models of both the first and new word models represent a probability distribution for the value of each of a plurality of parameters, each of which probability distributions is defined as the combination of a plurality of basis functions; and the probability distributions in the nodes of the new word model are represented by a different number of basis functions than the probability distributions in the first word model from which said synthesized word samples are derived.

22. A method as in claim 18 wherein:

the acoustic node models of both the first and new word models represent a probability distribution for the value of each of a plurality of parameters, each of which probability distributions is defined as the combination of one or more probability distribution basis functions of a given parametric family; and the probability distributions in the nodes of the new word model are represented by one or more probability distribution basis functions of a different parametric family than the one or more probability distribution basis functions used in the first word model from which said synthesized word samples are derived.

23. A method of developing acoustic word models for use in speech recognition comprising:

generating a first set of synthesized word samples, each of which includes a sequence of synthesized data samples in which one or more such data samples correspond to each of a plurality of acoustic node models in a first word model, where each synthesized data sample of the first set is generated from the first model node by Monte Carlo techniques using a probability distribution associated with said node; and generating a second set of synthesized word samples, each of which includes a sequence of synthesized data samples in which one or more such data samples correspond to each of a plurality of acoustic node models in a second, different, word model, where each synthesized data sample in the second set is generated from the second model node by Monte Carlo techniques using a probability distribution associated with said node; and training a new acoustic word model comprised of a sequence of node models from synthesized word samples of both the first and second set.

24. A method as in claim 23 wherein said first and second word models each model different pronunciations of the same word.

25. A method as in claim 23 wherein said first and second word models each model pronunciations of different words.

26. A method as in claim 25 wherein said first and second word models each model a set of multiple words, and the sets of words modeled by the first and second word models share one or more words.

27. A method as in claim 23 wherein the new word model and the first and second word models are each comprised of a sequence of acoustic node models and the sequence of node models of the new word model has a different structure than the sequence of node models of the first and/or second word model, and said different structure involves differences other than differences in parameter values.

28. A method as in claim 27 wherein the sequence of node models of the new word model has a different node topology than the sequence of node models associated with the first and/or second node model.

29. A method as in claim 27 wherein the node models of the new word model have a different model complexity than the node models associated with the first and/or second node model.

30. A method as in claim 27 wherein:

the node models of both the new word model and the first and second word models represent a probability distribution for the value of each of a plurality of parameters, each of which probability distributions is defined as the combination of one or more probability distribution basis functions of a given parametric family; and the probability distributions in the nodes of the new word model are represented by one or more probability distribution basis functions of a different parameter family than the one or more probability distribution basis functions used in the phonetic word model of the first and/or second word model.

31. A method as in claim 23 wherein the new word model is a non-phonetic word model and the first and/or second word model is a phonetic word model.

32. A method as in claim 31 wherein:

said phonetic word model is synthesized from a sequence of one or more phoneme models which have been trained from a plurality of training utterances; and said phonetic word model is determined by the phonetic spelling of a word which is not spoken in any of said training utterances, so the new, non-phonetic word model is derived for a word that is not spoken in the training utterances.

33. A method as in claim 23 wherein the first and/or second word model is derived from one or more sequences of acoustic samples that have undergone a first channel normalization;

a second channel normalization is performed upon said plurality of synthesized word samples to produce a corresponding plurality of modified synthesized word samples; and the new word model is trained from said plurality of modified synthesized word samples.

* * * * *